US012670211B2

(12) United States Patent
Eyzaguirre et al.

(10) Patent No.: US 12,670,211 B2
(45) Date of Patent: Jun. 30, 2026

(54) DETERMINING QUERY COMPLEXITY IN VIDEO QUESTION ANSWERING

(71) Applicants: TOYOTA RESEARCH INSTITUTE, INC., Los Altos, CA (US); THE BOARD OF TRUSTEES OF THE LELAND STANFORD JUNIOR UNIVERSITY, Stanford, CA (US)

(72) Inventors: Cristobal Eyzaguirre, Stanford, CA (US); Igor Vasiljevic, Chicago, IL (US); Achal Dave, San Francisco, CA (US); Jiajun Wu, Stanford, CA (US); Thomas Kollar, San Jose, CA (US); Juan Carlos Niebles, Mountain View, CA (US); Pavel Tokmakov, West Hollywood, CA (US)

(73) Assignees: TOYOTA RESEARCH INSTITUTE, INC., Los Altos, CA (US); TOYOTA JIDOSHA KABUSHIKI KAISHA, Aichi-Ken (JP); THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 0 days.

(21) Appl. No.: 19/039,607

(22) Filed: Jan. 28, 2025

(65) Prior Publication Data

US 2025/0355934 A1    Nov. 20, 2025

Related U.S. Application Data

(60) Provisional application No. 63/649,876, filed on May 20, 2024.

(51) Int. Cl.
*G06F 16/732* (2019.01)
*G06F 16/735* (2019.01)

(52) U.S. Cl.
CPC ........ *G06F 16/7343* (2019.01); *G06F 16/735* (2019.01)

(58) Field of Classification Search
CPC ............... G06F 16/7343; G06F 16/735
See application file for complete search history.

(56) References Cited

U.S. PATENT DOCUMENTS 11,157,554 B2    10/2021  Gan et al.
12,019,679 B2 *   6/2024  Kim .................... G06F 16/738
(Continued)

FOREIGN PATENT DOCUMENTS

CN        115391602 A      8/2022

OTHER PUBLICATIONS

Yang Liu et al., "A Robust Multivariate Reranking Algorithm for Question Answering Enrichment", IEEE, pp. 1917-1920 (Year: 2012).*

(Continued)

*Primary Examiner* — Jared M Bibbee
(74) *Attorney, Agent, or Firm* — Seyfarth Shaw LLP

(57) ABSTRACT

A method for determining a complexity of a natural language query includes converting a first natural language query into executable program code, the first natural language query being a query for a first video to be answered by one or more video question answering (VideoQA) models. The method also includes generating, via a complexity model, an abstract syntax tree (AST) based on the executable program code. The method further includes determining, via the complexity model, a complexity of the first natural language query based on quantity of subtrees, from a group of subtrees, that are present in the AST.

17 Claims, 7 Drawing Sheets

(56)         References Cited

U.S. PATENT DOCUMENTS

| | | | | |
|---|---|---|---|---|
| 12,124,440 | B1 * | 10/2024 | Romero Calvo | ........................... |
| | | | | G06F 16/24522 |
| 12,399,892 | B2 * | 8/2025 | Cao | ..................... G06F 16/2433 |
| 2015/0261744 | A1 * | 9/2015 | Suenbuel | .............. G06F 40/211 |
| | | | | 704/9 |
| 2018/0144065 | A1 * | 5/2018 | Yellai | ................ G06F 16/90332 |
| 2021/0191938 | A1 * | 6/2021 | Galitsky | ................ G06N 20/00 |
| 2022/0180056 | A1 * | 6/2022 | Hong | ................... G06N 3/0455 |
| 2022/0343903 | A1 * | 10/2022 | Mostafazadeh | ....... G06F 3/0481 |
| 2023/0325154 | A1 * | 10/2023 | Arcadinho | .............. G06F 40/40 |
| | | | | 717/113 |
| 2024/0004623 | A1 * | 1/2024 | Groenewegen | ........... G06F 8/42 |
| 2024/0061997 | A1 * | 2/2024 | Kobayashi | .............. G06F 8/427 |
| 2025/0217266 | A1 * | 7/2025 | Hicks | ................. G06F 11/3608 |

OTHER PUBLICATIONS

Khushboo Khurana et al., "Video Question-Answering Techniques, Benchmark Datasets and Evaluation Metrics Leveraging Video Captioning: A Comprehensive Survey", Feb. 9, 2021, vol. 9, pp. 43799-43823 (Year: 2021).*

Tat-Seng Chua, "Question Answering on Large News Video Archive", pp. 289-294 (Year: 2003).*

Vivek Gupta et al., "VQuAD: Video Question Answering Diagnostic Dataset", IEEE, pp. 282-291 (Year: 2022).*

Suris, Didac et al., "ViperGPT: Visual Inference via Python Execution for Reasoning," https://arxiv.org/abs/2303.08128, Mar. 14, 2023.

Stankov, Emil et al., "A New Tool for Calculation of a New Source Code Metric," 12th International Conference on Informatics and Information Technology (CiiT 2015), pp. 25-30.

Xiao, Junbin et al., "NEXT-QA: Next Phase of Question-Answering to Explaining Temporal Actions," IEEE/CVF Conference on Computer Vision and Pattern Recognition, 2021, pp. 9772-9781.

Su, Hung-Ting et al., "End-to-End Video Question-Answer Generation with Generator-Pretester Network," IEEE Transactions on Circuits and Systems for Video Technology, vol. 31, 2021.

Feng, Yunhe et al., "Investigating Code Generation Performance of ChatGPT with Crowdsourcing Social Data," IEEE 47th Annual Computers, Software, and Applications Conference (COMPSAC), 2023, pp. 876-885, 2023.

Dang, Long Hoang, et al., "Hierarchical Object-Oriented Spatio-Temporal Reasoning for Video Question Answering," Proceedings of the Thirteenth International Joint Conference on Artificial Intelligence (IJCAI-21), pp. 636-642, 2021.

Feitelson, Dror G., "From Code Complexity Metrics to Program Comprehension," Communications of the ACM, vol. 66, No. 5, pp. 52-61, May 2023.

* cited by examiner

300

Query: Where is this?

302

```
middle_frame = video.get_frame(video.num_frames // 2)
middle_caption = middle_frame.caption()
location = middle_frame.classify_location()
answer = answer_question(question, middle_caption, location)
```

304

410

400

Query: What was the teacher doing while he was playing the piano?

402

```
def execute_command(video, possible_answers, question):
    video_segment = VideoSegment(video)
    student_playing = False
    frame_of_interest = None
    for frame in enumerate(video_segment.frame_iterator()):
        if frame.detect_object("student") and \
           frame.simple_qa("Is the student playing the piano?") == "yes";
            student_playing = True
        elif student_playing and frame.detect_object("teacher"):
            frame_of_interest = frame
            break
    description = frame_of_interest.caption()
    info = {
        "Description of frame while student playing piano": description
    }
    answer = video_segment.answer_question(info, question, possible_answers)
    return answer, info
```

Convert a first natural language query into executable program code

504

Generate, via a complexity model, an abstract syntax tree (AST) based on the executable program code

506

Determine, via the complexity model, a complexity of the first natural language query based on quantity of subtrees, from a group of subtrees, that are present in the AST

DETERMINING QUERY COMPLEXITY IN VIDEO QUESTION ANSWERING

CROSS-REFERENCE TO RELATED APPLICATION

This application claims priority to U.S. Provisional Patent Application No. 63/649,876, filed on May 20, 2024, and titled "DETERMINING QUERY COMPLEXITY IN VIDEO QUESTION ANSWERING," the disclosure of which is expressly incorporated by reference in its entirety.

BACKGROUND

Field

Aspects of the present disclosure generally relate to artificial neural networks, and more specifically to systems and methods for determining a complexity of a query for video question answering (VideoQA).

Background

Video question answering (VideoQA) is an interdisciplinary field at the intersection of computer vision and natural language processing. A VideoQA model may provide answers to one or more questions about a video through a combined effort of visual comprehension and linguistic reasoning. VideoQA models may be used in a variety of real-time, intelligent applications, including human-AI interaction and advanced communication systems. In some cases, VideoQA models may be benchmarked on a difficulty of a query (e.g., question) regarding a video.

SUMMARY

In some aspects of the present disclosure, a method includes generating, via a virtual machine, a group of code traces, each code trace of the group of code traces corresponding to a respective algorithm, of a group of algorithms, and a corresponding input. The method further includes fine-tuning a generative model in accordance with the group of code traces. The method also includes receiving, at the fine-tuned generative model, computer programming code. The method further includes generating, via the fine-tuned generative mode, one or more computer programming code statements corresponding to the computer programming code or simulate an expected output of the computer programming code.

In some aspects of the present disclosure, a method includes converting a first natural language query into executable program code, the first natural language query being a query for a first video to be answered by one or more video question answering (VideoQA) models. The method further includes generating, via a complexity model, an abstract syntax tree (AST) based on the executable program code. The method also includes determining, via the complexity model, a complexity of the first natural language query based on the quantity of subtrees, from a group of subtrees, that are present in the AST.

Some other aspects of the present disclosure are directed to an apparatus. The apparatus includes means for converting a first natural language query into executable program code, the first natural language query being a query for a first video to be answered by one or more VideoQA models. The apparatus further includes means for generating, via a complexity model, an abstract syntax tree (AST) based on the executable program code. The apparatus also includes means for determining, via the complexity model, a complexity of the first natural language query based on the quantity of subtrees, from a group of subtrees, that are present in the AST.

In some other aspects of the present disclosure, a non-transitory computer-readable medium with program code recorded thereon is disclosed. The program code is executed by one or more processors and includes program code to convert a first natural language query into executable program code, the first natural language query being a query for a first video to be answered by one or more VideoQA models. The program code also includes program code to generate, via a complexity model, an abstract syntax tree (AST) based on the executable program code. The program code further includes program code to determine, via the complexity model, a complexity of the first natural language query based on the quantity of subtrees, from a group of subtrees, that are present in the AST.

Some other aspects of the present disclosure are directed to an apparatus. The apparatus includes one or more processors and one or more memories coupled with the one or more processors and storing processor-executable code that, when executed by the one or more processors, is configured to cause the apparatus to convert a first natural language query into executable program code, the first natural language query being a query for a first video to be answered by one or more VideoQA models. Execution of the processor-executable code further causes the apparatus to generate, via a complexity model, an abstract syntax tree (AST) based on the executable program code. Execution of the processor-executable code also causes the apparatus to determine, via the complexity model, a complexity of the first natural language query based on the quantity of subtrees, from a group of subtrees, that are present in the AST.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 4A is a diagram illustrating an example of translating a VideoQA query, in accordance with various aspects of the present disclosure.

DETAILED DESCRIPTION

Figure 1:
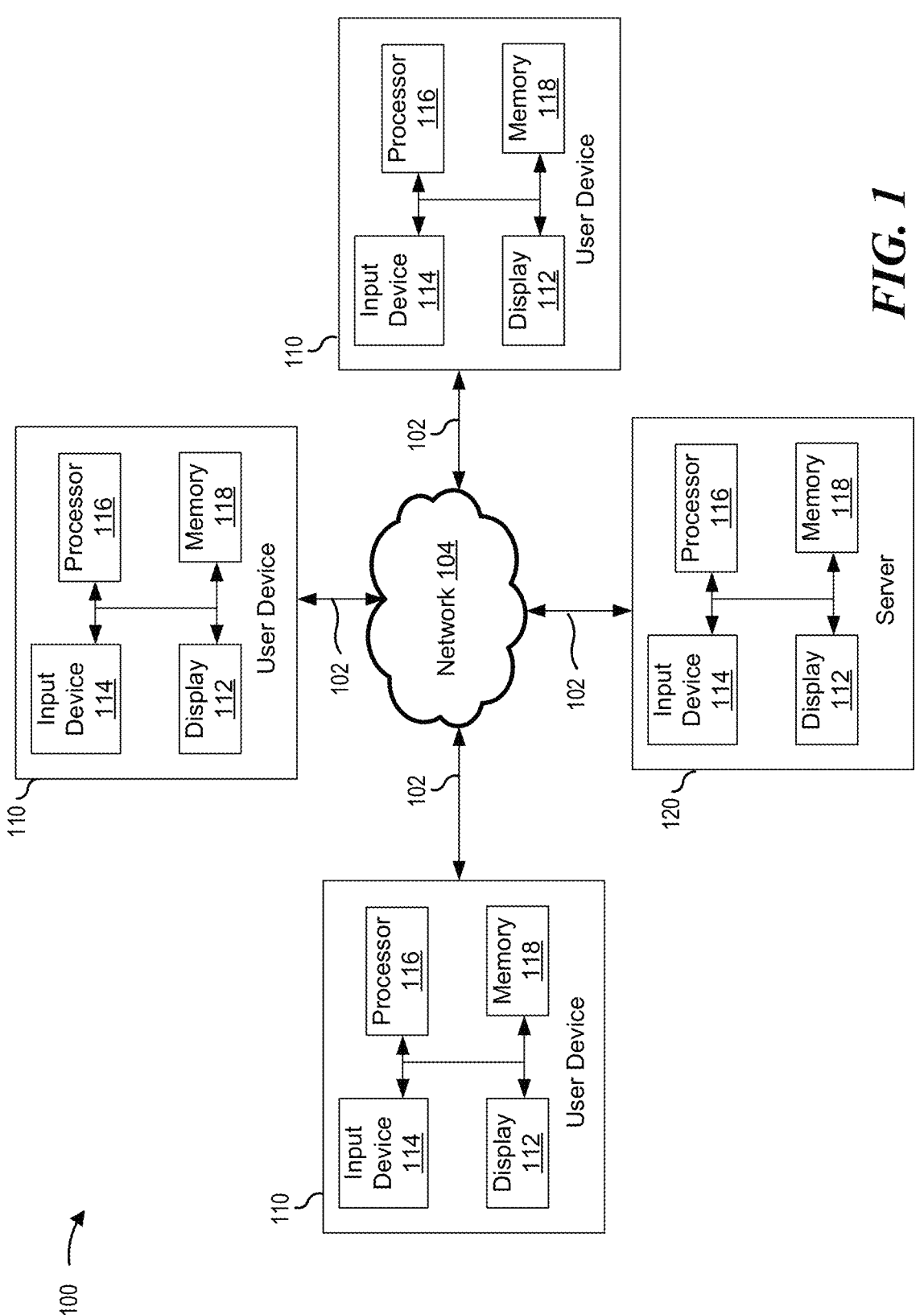
FIG. 1 is a block diagram illustrating an example of a system for accelerated learning that includes one or more surrogate models, in accordance with aspects of the present disclosure.

The detailed description set forth below and in Appendix A, in connection with the appended drawings, is intended as a description of various configurations and is not intended to represent the only configurations in which the concepts described herein may be practiced. The detailed description include specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented, or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks, and protocols, some of which are illustrated by way of example in the figures and in the following description of the preferred aspects. The detailed description and the drawings are merely illustrative of the present disclosure rather than limiting, the scope of the present disclosure being defined by the appended claims and equivalents thereof.

As discussed, video question answering (VideoQA) is an interdisciplinary field at the intersection of computer vision and natural language processing. A VideoQA model may provide answers to one or more questions about a video through a combined effort of visual comprehension and linguistic reasoning. These questions (e.g., queries) may be natural language queries. For example, in a birthday party video, the query may be: "how many candles are on the birthday cake." In this example, the VideoQA model would then respond to the query by analyzing the corresponding video and determining a number of candles on the birthday cake. VideoQA models may be used in a variety of real-time, intelligent applications, including human-AI interaction and advanced communication systems. In some cases, VideoQA models may be benchmarked on a difficulty of a query (e.g., question) regarding a video.

In conventional systems, the difficulty of a query may be set by a human. The human mind has the ability to analyze activities, integrate knowledge of space and time, and determine cause and effect. These abilities may be useful for navigating the complexities of dynamic environments, but they also make it challenging to determine what tasks are difficult for machines. In some cases, humans may find some questions to be more complex than others. However, when tested against various VideoQA models, questions deemed simple by a human may be more difficult for these systems to answer.

This discrepancy highlights a common misunderstanding regarding the challenges of VideoQA tasks. Historical trends in VideoQA benchmarks have consistently shown that many datasets tend to be populated with questions that simple, even naive, models can answer accurately by analyzing a single frame. Despite numerous efforts to overcome this issue by designing queries that are believed to be more challenging, most approaches have been top-down. Such top-down approaches begin with an expert's assumption of difficulty and then testing this hypothesis against VideoQA models focused on those specific abilities. In spite of efforts to generate difficult benchmark queries, some VideoQA models may achieve high performance by relying primarily on static visual information. Therefore, there is a need to accurately evaluate the difficulty of a VideoQA query.

Various aspects of the present disclosure are directed to estimating a complexity of one or more VideoQA queries. In some examples, a large language model (LLM) generates a modular executable program for answering a query (e.g., natural language query). A complexity model may estimate a complexity of the query by analyzing both the content and structure of the generated code. This function identifies patterns in the code that correlate with the difficulties encountered by VideoQA models. Specifically, the code complexity function links specific subroutines with model performance to identify patterns in the types of errors each VideoQA model tends to make. The code complexity function then combines these subroutines, sourced from various models, into a complexity metric. In some examples, the code complexity function may be used to generate challenging queries for VideoQA models. For ease of explanation, a VideoQA query may also be referred to as a query or a question, hereinafter used interchangeably.

In accordance with various aspects of the present disclosure, query complexity may be determined based on a complexity of code generated for responding to the question. Furthermore, the complexity model may identify complexities within existing VideoQA models. The complexity model may be used to generate a new benchmark that is more challenging than the existing benchmarks for VideoQA systems.

Particular aspects of the subject matter described in this disclosure can be implemented to realize one or more of the following potential advantages. In some examples, the described techniques of generating the modular executable program based on the query provide a process for improving the accuracy of a complexity metric. Improving the accuracy of the complexity metric may improve benchmark accuracy, thereby improving the development and testing of VideoQA models.

FIG. 1 is a block diagram illustrating an example of a system 100 for VideoQA, in accordance with aspects of the present disclosure. As shown in the example of FIG. 1, the system 100 may include one or more user devices 110 and one or more servers 120. For ease of explanation, only one server 120 is shown in the example of FIG. 1. Each user device 110 may be connected to a network 104 via one or more communication links 102. The communication links 102 may be wired and/or wireless communication links. The server 120 may also be connected to the network 104 via a communication link 102.

The network 104 may be an example of the Internet. Additionally, or alternatively, the network 104 may include any suitable computer network such as an intranet, a wide-area network (WAN), a local-area network (LAN), a wireless network, a digital subscriber line (DSL) network, a frame relay network, an asynchronous transfer mode (ATM) network, and/or a virtual private network (VPN). The communication links 102 may be any type of communication link that may be suitable for communicating data between user devices 110 and the server 120. For example, the communication links 102 may include one or more of network links, dial-up links, wireless links (e.g., Wi-Fi link, satellite link, or cellular communication link), and/or hard-wired links.

The server 120 may be a computing device, such as a server, processor, computer, cloud computing device, cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to host a VideoQA model, a complexity model, and/or other types of machine learning models, and communicate via a wireless or wired medium. In some examples, the server 120 may host the VideoQA model, the complexity model, and/or other types of machine learning models. In some such examples, one or more server 120 may work in tandem to host the VideoQA model, the complexity model, and/or other types of machine learning models. Specifically, the server 120 may implement functions and/or computer code that runs the VideoQA model, the complexity model, and/or other types of machine learning models.

Each user device 110 may be an example of a personal computing device, a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. A user device 110 may be used by a user to input a prompt the VideoQA model, the complexity model, and/or other types of machine learning models via an interface associated with the one or more models. The interface may be accessed via a website or a dedicate application, such as a mobile phone application. Additionally, or alternatively, the user device 110 may store the generative AI model, and the user may input a prompt via an interface associated with the stored generative AI model. In some examples, each user device 110 shown in FIG. 1 may be used by a different user. Each user device 110 and server 120 may be stationary or mobile.

In some examples, each user device 110 may be included inside a housing that houses components of the user device 110, such as one or more processors 116 and a memory 118. The housing may also include, or be connected to, a display 112 and an input device 114, which may be interconnected with other components of the user device 110. For ease of explanation, only one processor 116 is shown for each user device 110. In some examples, the one or more processors 116, the display 112, the input device 114, and the memory 118 may be interconnected via a bus architecture. The memory 118 may include one or more different types of memory, such as random access memory (RAM), static RAM (SRAM), dynamic RAM (DRAM), and/or another type of memory. Each user device 110 may also include a storage device (not shown in the example of FIG. 1), such as a hard disk (e.g., non-transitory computer readable medium). In some examples, the memory 118 and/or the storage device include program code (e.g., instructions) that may be executed by the processor 116 to control one or more functions of the user device 110. The input device 114 may be used to navigate the interface associated with the surrogate model, and/or perform other tasks. Working in conjunction with one or more components of the user device 110, the processor 116 may receive information associated with the VideoQA model, the complexity model, and/or other types of machine learning models, and control the display 112 to output information associated with the surrogate model. The display 112 may output (e.g., display) information received at the processor 116. In some examples, the processor 116 of the user device 110 is configured to perform operations and implement one or more elements associated with one or more processes, such as the process 500 described with respect to FIG. 5.

In some examples, a server 120 may be included inside a housing that houses components of the server 120, such as one or more processors 116 and a memory 118. The housing may also include, or be connected to, a display 112 and an input device 114, which may be interconnected with other components of the user device 110. For ease of explanation, only one processor 116 is shown for the server 120. In some examples, the one or more processors 116, the display 112, the input device 114, and the memory 118 may be interconnected via a bus architecture. The memory 118 may include one or more different types of memory, such as RAM, SRAM, DRAM, and/or another type of memory. The server 120 may also include a storage device (not shown in the example of FIG. 1), such as a hard disk (e.g., non-transitory computer readable medium). In some examples, the memory 118 and/or the storage device include program code (e.g., instructions) that may be executed by the processor 116 to control one or more functions of the server 120. For example, the processor 120 may execute instructions for maintaining the VideoQA model, the complexity model, and/or other types of machine learning models, training the VideoQA model, the complexity model, and/or other types of machine learning models, and/or executing the VideoQA model, the complexity model, and/or other types of machine learning models. In some examples, the processor 116 of the server 120 is configured to perform operations and implement one or more elements associated with one or more processes, such as the process 500 described with respect to FIG. 5. Additionally, or alternatively, the processor 116 of the server 120 may be configured to perform operations associated with the complexity module 260 described with reference to FIG. 2.

Figure 2:
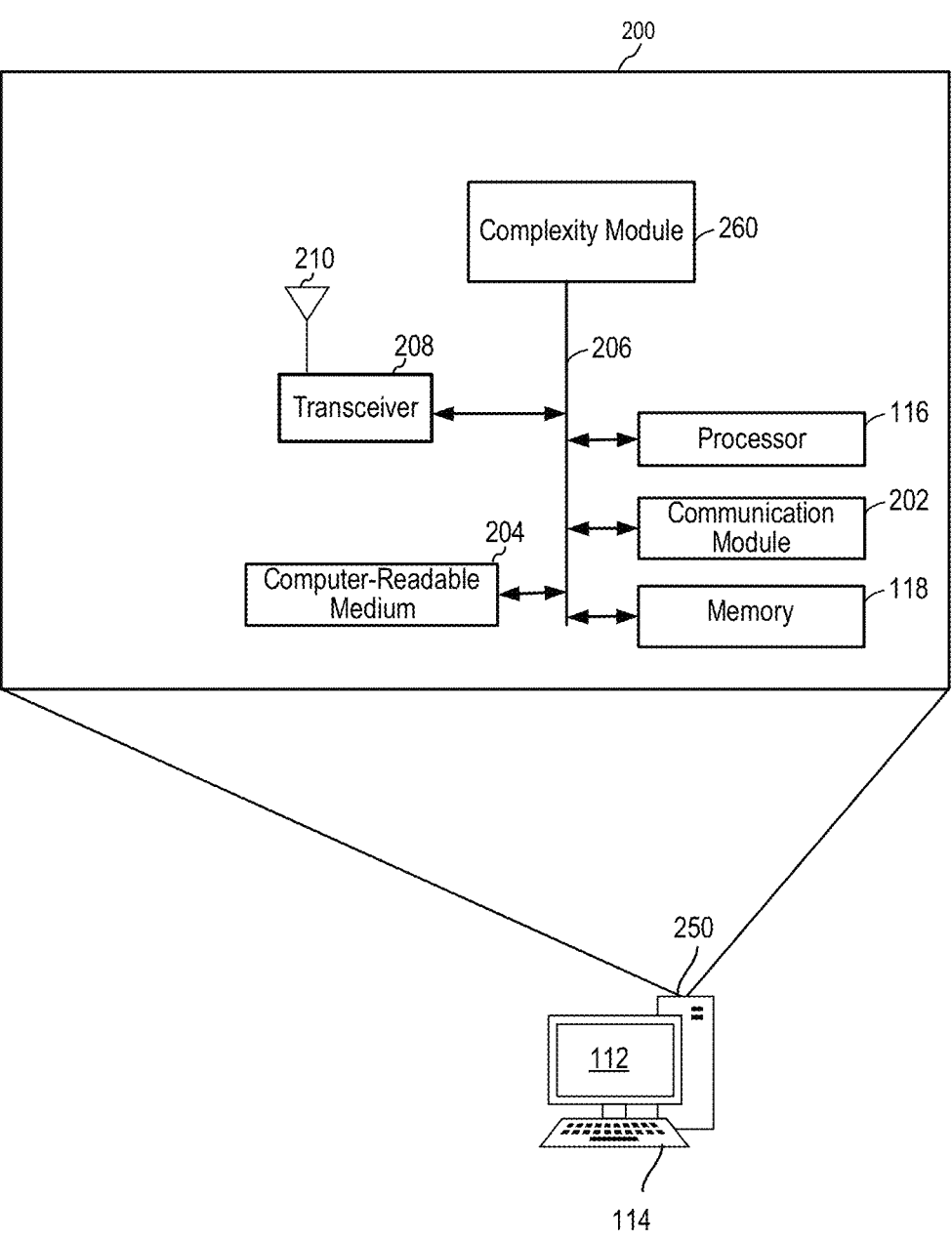
FIG. 2 is a diagram illustrating an example of a hardware implementation for a system, in accordance with aspects of the present disclosure.

FIG. 2 is a diagram illustrating an example of a hardware implementation for a system 200, according to various aspects of the present disclosure. The system 200 may be a component of a device 250. The device 250 may be an example of a user device 110 or a server 120 described with reference to FIG. 1. As shown in the example of FIG. 2, the device 250 may include a display 112 and an input device 114 (e.g., a keyboard). In some examples, the system 200 is configured to perform operations and implement one or more elements associated with one or more processes, such as the process 500 described with respect to FIG. 5.

The system 200 may be implemented with a bus architecture, represented generally by a bus 206. The bus 206 may include any number of interconnecting buses and bridges depending on the specific application of the system 200 and the overall design constraints. The bus 206 links together various circuits including one or more processors and/or hardware modules, represented by a processor 116, and a communication module 202. The bus 206 may also link various other circuits such as timing sources, peripherals, voltage regulators, and power management circuits, which are well known in the art, and therefore, will not be described any further.

The system 200 includes a transceiver 208 coupled to the processor 116, the communication module 202, and the computer-readable medium 204. The transceiver 208 is coupled to an antenna 210. The transceiver 208 communicates with various other devices over a transmission medium, such as a communication link 102 described with reference to FIG. 1. For example, the transceiver 208 may receive commands via transmissions from a user or a remote device.

As shown in the example of FIG. 2, the system 200 may include a complexity module 260 that may be trained to perform one or more tasks associated with determining a complexity of a query (e.g., question) for a VideoQA model. The query may also be referred to as a VideoQA query. In some examples, the complexity module 260 may implement (e.g., execute) a complexity model. For example, the complexity module 260 may be trained to perform the tasks described with reference to the one or more modules, machine learning models, and/or engines described with reference to FIG. 5. The complexity module 260 may include artificial or computational intelligence elements, such as, neural network, fuzzy logic, or other machine learning algorithms. In one or more arrangements, one or more of the other modules 116, 118, 202, 204, 208, can also include artificial or computational intelligence elements, such as, neural network, fuzzy logic, or other machine learning algorithms. Further, in one or more arrangements, one or more of the modules 116, 118, 202, 204, 208 can be distributed among multiple modules 116, 118, 202, 204, 208, 260 described herein. In one or more arrangements, two or more of the modules 116, 118, 202, 204, 208, 260 of the system 200 can be combined into a single module.

The system 200 includes the processor 116 coupled to the computer-readable medium 204. The processor 116 performs processing, including the execution of software stored on the computer-readable medium 204 providing functionality according to the disclosure. The software, when executed by the processor 116, causes the system 200 to perform the various functions described for a particular device, such as any of the modules 116, 118, 202, 204, 208, 260. For example, when executed by the processor 116, the software causes the system 200 and/or the complexity module 260 to implement one or more elements associated with one or more processes, such as the process 500 described with respect to FIG. 5. The computer-readable medium 204 may also be used for storing data that is manipulated by the processor 116 when executing the software. For example, working in conjunction with one or more of the other modules the modules 116, 118, 202, 204, and 208, the complexity module 260 may perform one or more operations, such as the operations of the process 500 described with reference to FIG. 5.

In some examples, the system 200 may include one or more of the modules 116, 118, 202, 204, 208, and 260 described with reference to FIG. 2. For example, the system 200 may include one or more processors 116 and one or more memories 118.

As indicated above, FIGS. 1 and 2 are provided as examples. Other examples may differ from what is described with regard to FIGS. 1 and 2.

Various training schemes may be used to train end-to-end architectures for video-language understanding. In some cases, a large video-language dataset obtained through automatic speech recognition (ASR) captions is used to train a model with contrastive frame-caption matching, masked language modeling, and re-ordering of scrambled video frames. In other cases, an end-to-end joint video and text architecture may use dVAE from DALL-E to generate tokens for masked video-text pre-training. In some other cases, masked space-time autoencoders may be trained on video sequences and tested on tasks, such as action recognition. In some other cases, image and video language tasks may be unified in a single architecture with task-specific modules pre-trained with masked language modeling, vision-language contrastive learning, and task instruction representation. Aspects of the present disclosure are not limited to a particular training scheme for training a VideoQA model.

Other systems may leverage single-image vision-language models for video understanding, hypothesizing that only a subset of video frames (often just a single frame) are relevant to answer a given query. Some systems use a frame selector to measure the extent to which single-frame image-centric baselines can address VideoQA. Some other systems may fine-tune BLIP2. First, BLIP2 may be fine-tuned to localize relevant keyframes, and then BLIP2 may be fine-tuned for a question answering module, which answers the question based on the selected frames, question, and candidate answers.

In the realm of VideoQA, synthetic datasets may be used for analyzing tasks related to question answering in computer vision. These datasets often use symbolic programs to represent tasks, which simplify the perceptual tasks into discrete operations, thereby distinguishing the perception process from higher-level reasoning. In some cases, these symbolic programs may be grouped into categories that specify similar cognitive abilities, facilitating a correlation between model performance and program structure. In contrast to conventional systems, various aspects of the present disclosure use code generation models to estimate the complexity of questions, eliminating the need for detailed annotations and expanding the applicability to a broader range of question types. Such aspects provide a direct, computable process for assessing question complexity, effectively linking theoretical concepts of complexity with practical machine learning applications.

Regarding the creation of new datasets for video understanding, conventional systems often adopt a top-down approach. Such conventional systems may use a human to hypothesize what might be challenging and then create samples based on this hypothesis. Synthetic VideoQA datasets, such as AGQA, ANetQA, VQuAD, and STAR, rely on a limited number of pre-designed templates to generate questions, limiting the diversity of the scenarios they can cover. More recent projects, like EgoSchema, leverage large language models to generate questions, filtering them through human annotators to match certain complexity levels. While this strategy is useful for advancing specific aspects of complexity, it restrictively narrows the range of challenges that VideoQA models are exposed to, often missing out on the variety of complex, real-world situations that do not conform to predefined notions of complexity.

Various aspects of the present disclosure are directed to estimating a complexity of one or more VideoQA queries. In some examples, a large language model (LLM) generates a modular executable program for answering a query (e.g., natural language query). A code complexity function may estimate a complexity of the query by analyzing both the content and structure of the generated code. This function identifies patterns in the code that correlate with the difficulties encountered by VideoQA models. Specifically, the code complexity function links specific subroutines with model performance to identify patterns in the types of errors each VideoQA model tends to make. The code complexity function then combines these subroutines, sourced from various models, into a complexity metric. In some examples, the code complexity function may be used to generate challenging queries for VideoQA models. For ease of explanation, a query may also be referred to as a question, hereinafter used interchangeably.

In accordance with various aspects of the present disclosure, query complexity may be determined based on a complexity of code generated for responding to VideoQA questions. Furthermore, the complexity model, also referred to as a code complexity function, may identify complexities within existing VideoQA models. The code complexity function may be used to generate a new benchmark that is more challenging than the existing benchmarks for VideoQA systems.

In some examples, a dataset $\mathcal{D}$ including a collection of videos V, questions Q, and answers A, where $\mathcal{D} = \{V, Q, A\}$, along with a set of K pre-trained models $\mathcal{M} = \{m_0, \ldots, m_K\}$. The objective is to develop a function C to classify questions $q_i \in Q$ into categories reflecting their complexity in relation to the models $\mathcal{M}$ groups based on their complexity with respect to M. The complexity may be represented as a metric. The metric may be general and consistent; for example, for any two questions $q_1$, $q_2 \in Q$, together with corresponding videos $v_1$, $v_2 \in V$, if $C(q_1) > C(q_2)$, then the performance P of any model $m_j \in M$ should be lower for $q_1$ compared to $q_2$, suggesting that models struggle more with complex questions.

Determining a complexity $\mathcal{C}$ of a natural language question q presents challenges, even for humans. In some examples, inspired by Kolmogorov Complexity (KC), various aspects of the present disclosure use an advanced intermediate representation of a question to determine the questions' complexity. In some examples, a code generation process is used. In such examples, a question q may be transformed into an executable program z by a program generator $\pi$ (e.g., $z=\pi(q)$). The program generator $\pi$ may be a part of a Large Language Model (LLM). Following this, an execution engine executes the program z to produce an answer â for a video v ($\hat{a}=\phi(v,z)$). The execution engine may be a proprietary engine or an off-the-shelf executing engine, such as Python. By converting the question into an executable program, the process may determine the intricacies of the question via the operational logic of the program.

Conventional software engineering metrics may convert code into complexity scores $\mathcal{C}(z) \rightarrow \mathbb{R}$ . $\mathcal{C}(z)$ is a complexity measure function that takes a program or code snippet z as input and outputs a real number $\mathbb{R}$ representing the complexity of the input. The real number output $\mathbb{R}$ quantifies the complexity, with higher values typically indicating more complex code. Such conventional software engineering metrics often focus on lines of code and cyclomatic complexity. Lines of code correlate the program's length with its complexity, $\mathcal{C}(z) \propto |z|$, while cyclomatic complexity measures the number of linearly-independent paths through the source code, expressed as $\mathcal{C}(z)=CC(z)$. Lines of code and cyclomatic complexity metrics reflect the structural complexity of the code, where higher values indicate more complex control flows, yet these metrics overlook the actual content of the code, which limits the predictive accuracy of the lines of code metric and the cyclomatic complexity metric.

To overcome these limitations, various aspects of the present disclosure use a novel code complexity function to assess components of the generated code that influence a complexity of a question. The code complexity function examines both structure and semantics. Specifically, the code complexity function breaks down the code of each question into basic syntactic units to form an abstract syntax tree (AST), T=compile (z), with nodes N and edges E, where nodes N represent various code elements, and edges E define their relationships. This AST approach strips the code from its literal syntax, focusing instead on fundamental logic and structure of the code.

In some examples, a comprehensive set may be obtained $\mathcal{T}(\mathcal{D}) = \{$compile $(z) | z \in \mathcal{P}(\mathcal{D})\}$ by creating ASTs for the dataset. $\mathcal{T}(\mathcal{D})$ represents the set of all ASTs derived from the code in the dataset $\mathcal{D}$ . Additionally, compile (z) represents a function that indicates a process of compiling a piece of code z into its AST. The AST is a tree representation of the source code, where each node represents a construct in the code, such as a variable, function, or control structure. $\mathcal{P}(\mathcal{D})$ represents a set of all programs or code snippets contained in the dataset $\mathcal{D}$ . Accordingly, $\mathcal{T}(\mathcal{D})$ is the set of all ASTs obtained by compiling each piece of code z found in the dataset $\mathcal{D}$ .

The code complexity function continues by mining the ASTs $\mathcal{T}$ to identify common subroutines, such as recurring logical patterns or functions, that occur in the code. The common subroutines may be common to a dataset or common to a group of datasets, learned over time. In ASTs subroutines manifest as subtrees S, where S=(N', E'), and where N'⊆N, E'⊆E and $\forall(u, v) \in E'$, $u \in N' \wedge v \in N'$. The statement $N' \subseteq N$ represents the set of nodes in the subtree (N') is a subset of the set of all nodes in the full AST (N). That is, every node in the subtree is also a node in the larger tree. Likewise, $E' \subseteq E$ indicates that the set of edges in the subtree (E') is a subset of the set of all edges in the full AST (E). That is, every edge in the subtree is also an edge in the larger tree. $\forall (u, v) \in E'$, $u \in N' \wedge v \in N''$, specifies that for every edge (u, v) in the set of edges in the subtree (E'), both nodes u and v that the edge connects must be in the set of nodes in the subtree (N'). This ensures that the edges in the subtree only connect nodes that are also within that subtree, maintaining the integrity of the subtree as a valid structure within the larger AST.

The code complexity function ensures that these subtrees are valid executable code segments. A function $\mathcal{G}(T)$ is used to identify valid subtrees. The function $\mathcal{G}(T)$ yields an unordered set of all valid subtrees of T, denoted as $\mathcal{G}(T) = \{S_1, S_2, \ldots, S_n\}$. Considering the entire dataset, the collection of all valid subtrees across the dataset may be represented as $\mathcal{S}(\mathcal{D}) = \bigcup_{T \in \mathcal{T}(\mathcal{D})} \mathcal{G}(T)$. Specifically, to obtain the set of all valid subtrees $\mathcal{S}$ extracted from the entire dataset $\mathcal{D}$, for each AST T of the set of ASTs $\mathcal{T}(\mathcal{D})$, all valid subtrees $\mathcal{G}(T)$ are extracted, and then combined into the set $\mathcal{S}(\mathcal{D})$. As such, $\mathcal{S}(\mathcal{D})$ represents a comprehensive collection of all valid subtrees from every AST derived from the code in the dataset $\mathcal{D}$, providing a detailed view of the various code structures and patterns present across the dataset.

After determining the set of all valid subtrees $\mathcal{S}(\mathcal{D})$, the code complexity function consolidates subtrees to remove redundancies, forming a subset $\mathcal{S}_{\text{merged}}(\mathcal{D})$ that excludes any subtree contained within another, frequently co-occurring subtree. Specifically, $\mathcal{S}_{\text{merged}}(\mathcal{D})$ is a subset of $\mathcal{S}(\mathcal{D})$ that excludes $S_2$ if there exists a subtree $S_1$ such that $S_1$ and $S_2$ always co-occur and $S_2$ is contained in $S_1$. For example, if every time $S_2$ appears in the dataset $\mathcal{D}$, it is always as part of $S_1$ (meaning $S_2$ is a smaller part or subsection of $S_1$), then $S_2$ is considered redundant for the purpose of complexity analysis because its occurrence is never independent of $S_1$. In such cases, $S_2$ is excluded from $\mathcal{S}_{\text{merged}}(\mathcal{D})$, such that the merged set contains only the more comprehensive subtree $S_1$ that includes $S_2$ within it. A subgraph isomorphism test may confirm the presence of specific subroutines in an AST T:

$$ISO(T, S) \equiv S \in \mathcal{G}(T) \tag{1}$$

In Equation 1, ISO(T,S) represents a subgraph isomorphism check between a tree T (e.g., an AST) and a subtree S. Subgraph isomorphism is the condition where one graph (in this case, S) is a part of another graph (here, T) in such a way that there is a one-to-one correspondence between the nodes and edges of the subtree and some portion of the larger tree. That is, the ISO function checks if the subtree S can be found exactly within the tree T without any alterations or mismatches. $S \in \mathcal{G}(T)$ indicates that the subtree $S \in \mathcal{G}(T)$ is a member of the set of all valid subtrees $\mathcal{G}(T)$ extracted from the tree T. As discussed, $\mathcal{G}(T)$ represents the set that contains all such subtrees of the tree T that are considered valid, meaning they adhere to the syntactical and structural rules defined for the subtrees in the context of the larger tree's language or structure. As such, based on Equation 1, a subtree S is considered a valid part of the larger tree T if and only if it can be found as an isomorphic subgraph within the tree T.

For quantifying complexity, an index may be assigned to each subtree in $\mathcal{S}_{\text{merged}}(\mathcal{D})$ and each question $q_i$ in the dataset may be encoded using one-hot encoding $x_i \in \mathbb{R}^{|\mathcal{S}_{\text{merged}}(\mathcal{D})|}$, where each encoding's element corresponds to the presence or absence of a subtree in the question's AST. Specifically, a value of one in index k of a vector $x_i$ signifies the presence of subtree $S_k$ in question's AST $T_i$.

$$x_{ik} = \begin{cases} 1 & \text{if } ISO(T_i, S_k) \\ 0 & \text{otherwise} \end{cases} \tag{2}$$

In Equation 2, if $ISO(T_i, S_k)$ is true, which means subtree $S_k$ is isomorphically present in the AST of the question $T_i$, the index k in the vector $x_i$ will be set to one. Otherwise, if the subtree $S_k$ is not present in the AST of the question $T_i$, the corresponding index k in the vector $x_i$ is zero. Here, $x_{ik}$ represents the k-th element of the one-hot encoding vector $x_i$ for the i-th question. This encoding translates the structural aspects of the code into a numerical format. Specifically, this representation transforms the code into a fixed-size vector that facilitates the application of a machine learning model, such as a logical regression model. The machine learning model may predict model performance on the questions, treating each question-model pair as a distinct case. In some examples, the complexity model may be trained to identify subtrees that are universally challenging for VideoQA models.

In some examples, the machine learning model (e.g., logical regression model) may be trained on the one-hot encodings to predict the success of models $m_j$ within the set $\mathcal{M}$ ($m_j \in \mathcal{M}$). The training set effectively treats each $$\left( x_i, y_i^{(j)} \right)$$

pair as a distinct instance, where $x_i$ is a one-hot encoding for a question i and $$y_i^{(j)}$$

is the binary outcome for the question i with respect to model $m_j$ (one for success, zero for failure). In this context, the logistic regression model detects which aspects of the code's structure consistently lead to challenges across various models, reflecting the structural complexity of the questions. By analyzing these instances that lead to challenges across various models, the system can learn which aspects of a question's structure make it difficult for models to answer correctly. This understanding can be used to determine which subtrees increase the complexity of a query.

Finally, the logistic regression outcome may be used by a complexity model CodePlexity(z), where CodePlexity(z)=$-\hat{y}_i = -\sigma(wx_i + b)$. Here, $\sigma$ represents a logistic function, w represents a weight vector learned by the regression, and b is a bias term. The complexity model (CodePlexity (z))

quantifies the complexity of a question based on the likelihood of different models failing or succeeding in answering the question, as learned through the logistic regression analysis. Additionally, the complexity model (e.g., CodePlexity (z)) allows for a nuanced understanding of question complexity, informed by actual model performance data.

In various aspects of the present disclosure, the subtree analysis approach may obtain further insights into a complexity of the sources for existing VideoQA models. For example, in contrast to conventional black-box metrics, various aspects of the present disclosure provide a nuanced understanding of question complexity. In some examples, a numerical score may indicate question complexity. Additionally, the subtree analysis may identify one or more subroutines that impact the performance of a VideoQA model. In some examples, the subtree analysis identifies subtrees that are likely to decrease the performance of model $m_j$ with a degree of statistical significance that is greater than or equal to a threshold. In some such examples, the threshold may be 0.99. To validate the impact of a subtree on the performance of the model $m_j$, a statistical framework may be established. The statistical framework may begin with a null hypothesis (H0), which suggests that the presence of a particular subtree does not affect the performance of the model:

$$H0:\ P(m_j, q_1 | S \in \mathcal{S}(\mathcal{D})) = P(m_j, q_1 | S \notin \mathcal{S}(\mathcal{D})) \qquad (3)$$

In Equation 3, $P(m_j, q_1 | S \in \mathcal{S}(\mathcal{D}))$ represents the probability of the model $m_j$ successfully answering the question $q_1$ given that the subtree S is present in the question's corresponding abstract syntax tree (AST). Additionally, $P(m_j, q_1 | S \notin \mathcal{S}(\mathcal{D}))$ represents the probability of the model $m_j$ successfully answering the question $q_1$ given that the subtree S is not present in the question's AST. $\mathcal{S}(\mathcal{D})$ represents a set of all valid subtrees extracted from all questions' ASTs in a dataset $\mathcal{D}$. Conversely, an alternative hypothesis (HA) posits that the absence of the subtree S results in a higher proportion of successful answers, implying that the presence of the subtree S negatively impacts performance:

$$HA:\ P(m_j, q_1 | S \in \mathcal{S}(\mathcal{D})) < P(m_j, q_1 | S \notin \mathcal{S}(\mathcal{D})) \qquad (4)$$

These hypotheses H0 and HA may be tested using a one-sided statistical test to determine whether certain subtrees are indeed linked to decreased performance. The decrease in performance may be quantified by defining a subset of subtrees $$S^*_{m_j}(\mathcal{D}),$$

where each subtree in the subset is statistically correlated with a performance decrement in the model $m_j$:

$$S^*_{m_j}(\mathcal{D}) = \{S \in \mathcal{S}(\mathcal{D}) | p(S, m_j) < 0.01\} \qquad (5)$$

In Equation 5, $p(S, m_j)$ represents a p-value, which measures a strength of the evidence against the null hypothesis. For example, a p-value less than 0.01 indicates strong evidence that the presence of the subtree is detrimental to the model's performance. To identify subtrees that consistently cause performance degradation across multiple models, the intersection of these individual sets may be analyzed:

$$S^* = \bigcap\nolimits_{m_j \in \mathcal{M}} S^*_{m_j}(\mathcal{D}) \qquad (6)$$

Specifically, Equation 6 represents the intersection of subsets of subtrees that are determined to negatively impact the performance of each machine learning model $m_j$ within a set $\mathcal{M}$. In Equation 6, $S^*$ represents a final set of subtrees that consistently cause a decrease in performance across all the models in the set $\mathcal{M}$. These subtrees are identified as universally challenging or problematic, regardless of the specific characteristics or configurations of the individual models. In practice, S* may be computed by finding those subtrees which appear in every subset $$S^*_{m_j}(\mathcal{D}),$$

meaning that these particular subtrees are detrimental to all the models considered. The resulting set $S^*$ may highlight specific areas in the code structures (represented as subtrees in ASTs) that universally present challenges to the models.

Figure 3:
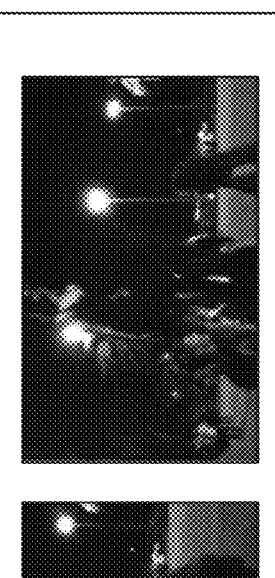
FIG. 3 is a diagram illustrating an example of estimating a complexity of a video question answering (VideoQA) query, in accordance with various aspects of the present disclosure.
Figure 3:
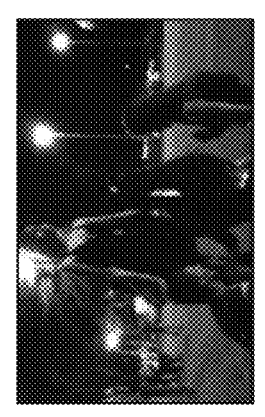
Figure 3:
Figure 3:

FIG. 3 is a diagram illustrating an example of estimating a complexity of a VideoQA query 300, in accordance with various aspects of the present disclosure. In the example of FIG. 3, the VideoQA query 300 (q) may be translated into an executable program 304 (z). As discussed, in some examples, a program generator π from an LLM may be used to translate the question into the is used to translate the query 300 (q) into the executable program 304 (z). Then, a complexity model (CodePlexity) may then be used to determine the complexity of the query 300 (q) based on the executable program 304 (z). For example, as discussed, the complexity model receives the executable program 304 (z) and the complexity may be based on a vector associated with an abstract syntax tree (AST) T with nodes N and edges E. In some examples, a code complexity module 260 described with reference to FIG. 2 may be specified to execute and/or implement the program generator π, the LLM, and the complexity model.

FIG. 4A is a diagram illustrating an example of translating a VideoQA query 400, in accordance with various aspects of the present disclosure. In the example of FIG. 4A, the VideoQA query 400 (q) may be translated into an executable program 402 (z). The query 400 ("What was the teacher doing while he was playing the piano") may be associated with a video segment 410. As discussed, in some examples, a program generator π from an LLM may be used to translate the question into the is used to translate the query 400 (q) into the executable program 402. In some examples, a code complexity module 260 described with reference to FIG. 2 may be specified to execute and/or implement the program generator π and the LLM.

Figure 4B:
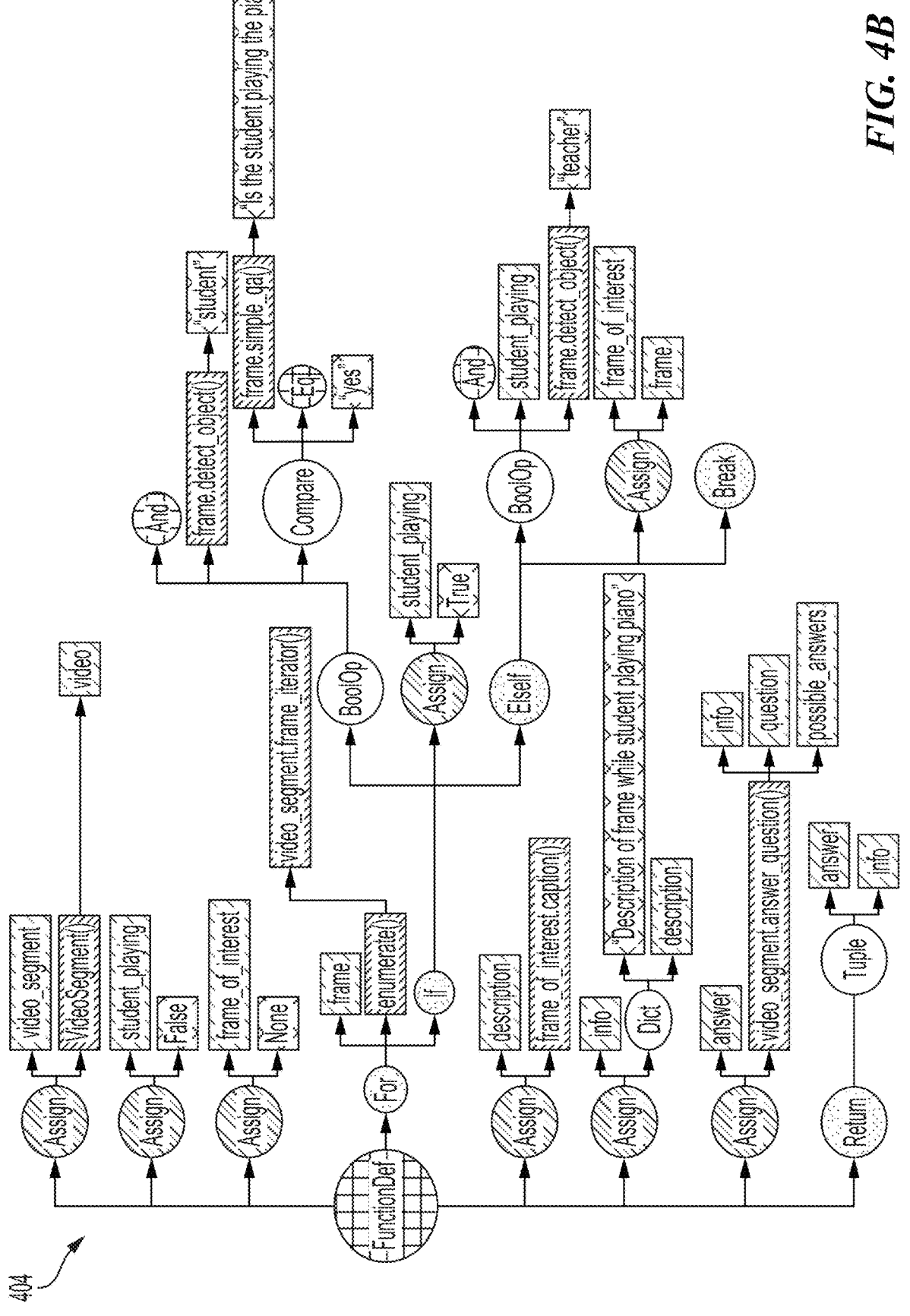
FIG. 4B is a diagram illustrating an example of an abstract syntax tree (AST), in accordance with various aspects of the present disclosure.

FIG. 4B is a diagram illustrating an example of an AST 404, in accordance with various aspects of the present disclosure. In the example of FIG. 4B, the AST 404 (T) may be generated from the executable program 402 described with reference to FIG. 4A. As discussed, a function, such as compile(z), may be specified to generate the AST 404 (T) with nodes N and edges E. The AST 404 visually represents a structure of the code 402 described with reference to FIG. 4A. Each node (N) (not labeled in the example of FIG. 4B) in the AST 404 corresponds to a part of the code, such as a variable or a function. Additionally, the connections (edges E) between these nodes define how these code elements interact, such as which functions call which variables. The set of all AST for a dataset $\mathcal{D}$ is represented by $\mathcal{T}(\mathcal{D})$, where $\mathcal{T}(\mathcal{D}) = \{compile\ (z)|z \in \mathcal{P}(\mathcal{D})\}$.

As discussed, in some examples, the comprehensive set T may be analyzed for common subroutines. Subroutines are examples of smaller sections of the code that repeat across different pieces of code within the comprehensive set T and are represented as subtrees within the AST. Valid subtrees are those that conform to the correct syntax and logical structure expected in the programming language. As discussed, a function $\mathcal{G}(T)$ yields an unordered set of all valid subtrees within an AST. Additionally, the collection of all valid subtrees across the dataset $\mathcal{D}$ can be represented as $\mathcal{S}(\mathcal{D}) = \mathsf{U}_{T \in \mathcal{T}(\mathcal{D})}\mathcal{G}(T)$.

Figure 4C:
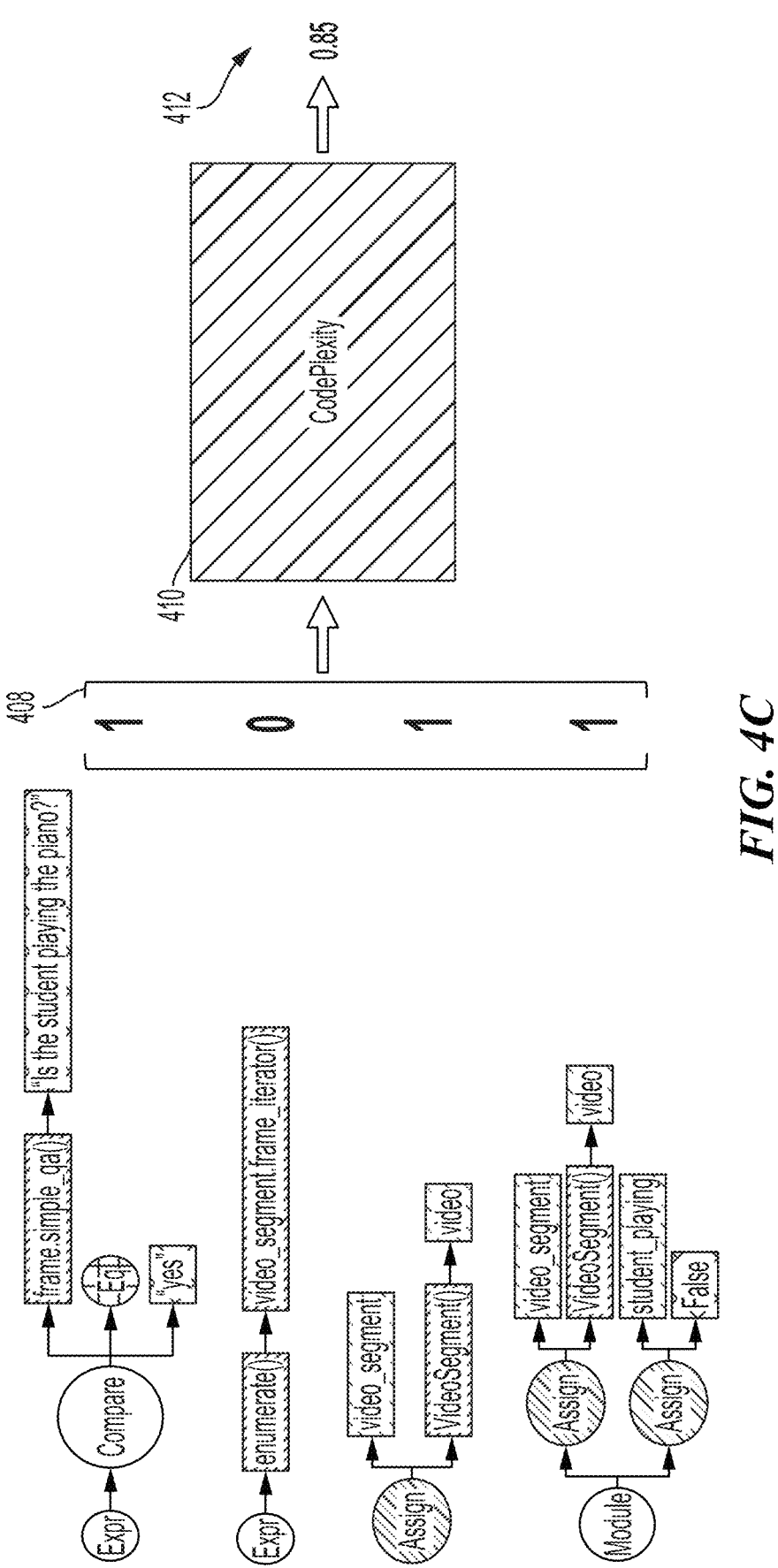
FIG. 4C is an example of generating a code complexity metric based on subtrees associated with ASTs in a dataset, in accordance with various aspects of the present disclosure.

FIG. 4C is an example of generating a code complexity metric 412 based on subtrees 406 associated with ASTs in a dataset, in accordance with various aspects of the present disclosure. In the example of FIG. 4C, the subtrees 406 represent the collection of all valid subtrees across the dataset $\mathcal{D}$. As shown in the example of FIG. 4C, an AST, such as the AST 404 described with reference to FIG. 4B, is encoded into a numerical vector 408 where each position corresponds to a particular subtree of the subtrees 406. If the subtree is present in the question's AST, the position in the vector 408 is marked with a 1, otherwise, the position is marked with a 0. This numerical representation translates the structural complexity of the code 402 into a format that can be processed by machine learning models. That is, each subtree may be categorized according to its impact on the performance of one or more VideoQA models. Using the encoded vector 408, a machine learning model, such as the complexity model 410, may predict how challenging each question is based on its code complexity. The model 410 treats each question as a unique case, helping to assess which code features contribute to higher complexity.

In some examples, the complexity metric described above may be used to generate (e.g., automatically generate) challenging question-answer pairs for any given set of videos. In some examples, a question generation system begins with a set of videos V paired with natural language summaries C. These summaries may be manually annotated or automatically generated. For ease of explanation, it is assumed the summaries are automatically generated by a summary model (e.g., image captioning model) that may use existing datasets with scene graph annotations. The summary model may generate summaries that effectively describe video content in a format that is comprehensible to language models.

In some examples, a large language model (LLM) may be specified to generate question and answer candidates based on each video summary, $\tilde{q}$, $\tilde{a}$=LLM (c, prompt). For example, the LLM may receive a specific video summary c describing the video and a prompt directing the model's focus (e.g., asking the LLM to formulate a question based on the content described). Upon receiving the inputs, the LLM applies its pre-trained knowledge and understanding of language to generate a relevant question $\tilde{q}$ and an appropriate answer $\tilde{a}$.

Each generated question $\tilde{q}$ may then be transformed into code, and the complexity of each question $\tilde{q}$ is estimated using the trained complexity model (CodePlexity) model. In some examples, a complexity threshold $\delta$ may be established, and a subset of candidate questions $\tilde{Q}^*$ may be selected based on the threshold $\delta$. Each question in the subset of candidate questions $\tilde{Q}^*$ having a complexity that is equal to or greater than the threshold $\delta$.

$$\tilde{Q}^* = \left\{\tilde{q} \in \tilde{Q}|\mathcal{C}(\tilde{q}) \geq \delta\right\} \tag{7}$$

In Equation 7, $\tilde{Q}$ represents a complete set of generated questions. This set may include all candidate questions that may be included in the subset $\tilde{Q}^*$. Additionally, $\mathcal{C}(\tilde{q})$ represents the complexity model (CodePlexity) that measures the complexity of each question $\tilde{q}$. The subset $\tilde{Q}^*$ may then be used for various purposes, such as training models in understanding and responding to complex queries, conducting assessments in educational settings, or enhancing question-answering systems with more challenging queries.

To ensure a high quality for a final dataset $\tilde{\mathcal{D}}^*$, where $\tilde{\mathcal{D}}^* = \{V, \tilde{Q}^*, \tilde{A}^*\}$, question-answer pairs that cannot be accurately answered based on the video content may be reviewed and filtered. In some examples, the review and filtering may be manually performed. In other examples, a machine learning model may be trained to review and filter question-answer pairs. This step may be specified to address potential inaccuracies, such as hallucinations, in the generated summaries or errors introduced by the LLM.

Figure 5:
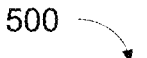
FIG. 5 is a flow diagram illustrating an example process for estimating a complexity of a VideoQA query, in accordance with some aspects of the present disclosure.
Figure 5:
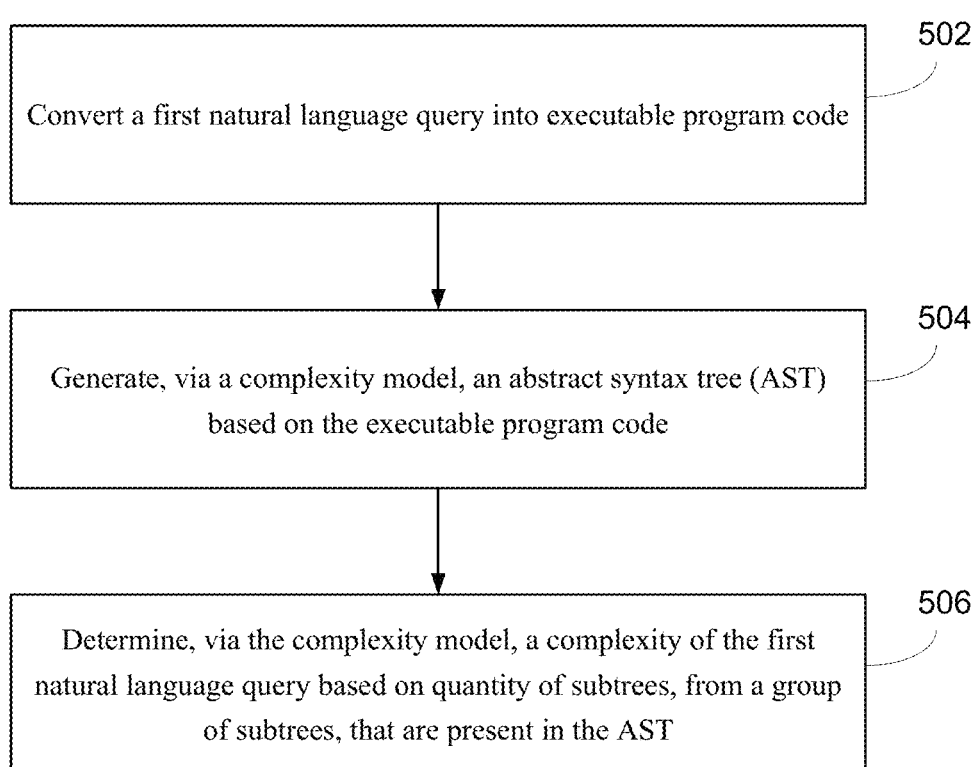

FIG. 5 is a flow diagram illustrating an example process 500 for estimating a complexity of a VideoQA query, in accordance with some aspects of the present disclosure. The process 500 may be performed by a complexity module 260 described with reference to FIG. 2. As shown in FIG. 5, the process 500 begins at block 502 by converting a first natural language query into executable program code. The first natural language query may be a query for a first video to be answered by one or more video question answering (VideoQA) models. At block 504, the process 500 generates, via a complexity model, an abstract syntax tree (AST) based on the executable program code.

At block 506, the process 500 determines, via the complexity model, a complexity of the first natural language query based on quantity of subtrees, from a group of subtrees, that are present in the AST. The complexity may be based on a likelihood of each of the one or more VideoQA models failing to answer the query The group of subtrees may be subtrees that are common among a group of natural language queries. Additionally, each subtree in the group of subtrees may decrease a probability of the one or more VideoQA models correctly answering the first natural language query.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine-readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for determining a complexity of a natural language query, comprising:

converting a first natural language query into executable program code, the first natural language query being a query for a first video to be answered by one or more video question answering (VideoQA) models;

generating, via a complexity model, an abstract syntax tree (AST) based on the executable program code;

determining, via the complexity model, a complexity of the first natural language query based on a quantity of subtrees, from a group of subtrees, that are present in the AST;

generating, via a large language model, a group of queries associated with a second video based on a prompt and a natural language summary of the second video; and selecting, via the complexity model, one or more queries of the group of queries, a respective complexity of each of the one or more queries being greater than or equal to a complexity threshold.

2. The method of claim 1, wherein the group of subtrees are subtrees that are common among a group of natural language queries.

3. The method of claim 1, wherein each subtree in the group of subtrees decreases a probability of the one or more VideoQA models correctly answering the first natural language query.

4. The method of claim 1, wherein:

determining the complexity further comprises encoding, via one-hot encoding, the AST into a vector based on the quantity of subtrees, from a group of subtrees, that are present in the AST;

the complexity model determines the complexity based on the vector.

5. The method of claim 1, further comprising generating the natural language summary via an image captioning model.

6. The method of claim 1, wherein the complexity is based on a likelihood of each of the one or more VideoQA models failing to answer the query.

7. An apparatus for determining a complexity of a natural language query, comprising:

one or more processors; and one or more memories coupled with the one or more processors and storing processor-executable code that, when executed by the one or more processors, is configured to cause the apparatus to:

convert a first natural language query into executable program code, the first natural language query being a query for a first video to be answered by one or more video question answering (VideoQA) models;

generate, via a complexity model, an abstract syntax tree (AST) based on the executable program code; and determine, via the complexity model, a complexity of the first natural language query based on a quantity of subtrees, from a group of subtrees, that are present in the AST;

generate, via a large language model, a group of queries associated with a second video based on a prompt and a natural language summary of the second video; and select, via the complexity model, one or more queries of the group of queries, a respective complexity of each of the one or more queries being greater than or equal to a complexity threshold.

8. The apparatus of claim 7, wherein the group of subtrees are subtrees that are common among a group of natural language queries.

9. The apparatus of claim 7, wherein each subtree in the group of subtrees decreases a probability of the one or more VideoQA models correctly answering the first natural language query.

10. The apparatus of claim 7, wherein:

execution of the processor-executable code to determine the complexity further causes the apparatus to encode, via one-hot encoding, the AST into a vector based on the quantity of subtrees, from a group of subtrees, that are present in the AST;

the complexity model determines the complexity based on the vector.

11. The apparatus of claim 7, wherein execution of the processor-executable code further causes the apparatus to generate the natural language summary via an image captioning model.

12. The apparatus of claim 7, wherein the complexity is based on a likelihood of each of the one or more VideoQA models failing to answer the query.

13. A non-transitory computer-readable medium having program code recorded thereon for determining a complexity of a natural language query, the program code executed by one or more processors and comprising:

program code to convert a first natural language query into executable program code, the first natural language query being a query for a first video to be answered by one or more video question answering (VideoQA) models;

program code to generate, via a complexity model, an abstract syntax tree (AST) based on the executable program code; and program code to determine, via the complexity model, a complexity of the first natural language query based on a quantity of subtrees, from a group of subtrees, that are present in the AST;

program code to generate, via a large language model, a group of queries associated with a second video based on a prompt and a natural language summary of the second video; and program code to select, via the complexity model, one or more queries of the group of queries, a respective complexity of each of the one or more queries being greater than or equal to a complexity threshold.

14. The non-transitory computer-readable medium of claim 13, wherein the group of subtrees are subtrees that are common among a group of natural language queries.

15. The non-transitory computer-readable medium of claim 13, wherein each subtree in the group of subtrees decreases a probability of the one or more VideoQA models correctly answering the first natural language query.

16. The non-transitory computer-readable medium of claim 13, wherein:

the program code to determine the complexity further comprises program code to encode, via one-hot encoding, the AST into a vector based on the quantity of subtrees, from a group of subtrees, that are present in the AST;

the complexity model determines the complexity based on the vector.

17. The non-transitory computer-readable medium of claim 13, wherein the program code further comprises program code to generate the natural language summary via an image captioning model.

\* \* \* \* \*